United States Patent [19]
Meng et al.

[11] Patent Number: 5,872,067
[45] Date of Patent: Feb. 16, 1999

[54] GLASS FIBER STRAND MATS, THERMOPLASTIC COMPOSITES REINFORCED WITH THE SAME AND METHODS FOR MAKING THE SAME

[75] Inventors: Jian Meng, Pittsburgh; Thomas V. Thimons, Allison Park; Thomas P. Unites, Library, all of Pa.

[73] Assignee: PPG Industries, Inc., Pittsburgh, Pa.

[21] Appl. No.: 828,213

[22] Filed: Mar. 21, 1997

[51] Int. Cl.$^6$ ........................................ B32B 7/08
[52] U.S. Cl. ................. 442/387; 442/331; 442/334; 442/381; 442/389; 442/393; 442/402; 442/404; 442/58; 264/258; 156/60; 156/148; 428/378
[58] Field of Search ................... 442/331, 334, 442/381, 387, 389, 393, 402, 494, 58; 264/258; 156/60, 148; 428/378

[56] References Cited

U.S. PATENT DOCUMENTS

| | | | |
|---|---|---|---|
| 3,614,936 | 10/1971 | Phillips | 112/420 |
| 3,664,909 | 5/1972 | Ackley | 161/141 |
| 3,713,962 | 1/1973 | Ackley | 161/154 |
| 3,756,893 | 9/1973 | Smith | 156/440 |
| 3,850,723 | 11/1974 | Ackley | 156/180 |
| 3,889,035 | 6/1975 | Jakes | 428/227 |
| 4,112,174 | 9/1978 | Hannes et al. | 428/220 |
| 4,129,674 | 12/1978 | Hannes et al. | 428/285 |
| 4,277,531 | 7/1981 | Picone | 428/228 |
| 4,318,774 | 3/1982 | Powell et al. | 162/129 |
| 4,335,176 | 6/1982 | Baumann | 428/228 |
| 4,640,810 | 2/1987 | Laursen et al. | 264/518 |
| 4,675,226 | 6/1987 | Ott | 428/102 |
| 4,847,140 | 7/1989 | Jaskowski | 428/220 |
| 4,886,701 | 12/1989 | Ehnert et al. | 428/282 |
| 4,931,358 | 6/1990 | Wahl et al. . 428/285 et al. | 428/280 |

(List continued on next page.)

FOREIGN PATENT DOCUMENTS

| | | |
|---|---|---|
| 0341977A2 | 11/1989 | European Pat. Off. . |
| 0409993A1 | 1/1991 | European Pat. Off. . |
| 0745716 | 4/1996 | European Pat. Off. . |
| 3535272 | 4/1995 | Germany . |
| 3321006 | 8/1995 | Germany . |
| 51-149974 | 6/1975 | Japan . |
| 1246453 | 3/1988 | Japan . |
| 7-82645 | 6/1988 | Japan . |
| 5078967 | 9/1991 | Japan . |
| 8-48194 | 5/1993 | Japan . |
| 8-20291 | 6/1994 | Japan . |
| 816305 | 2/1996 | Japan . |
| 6248550 | 3/1997 | Japan . |
| 2180562 | 4/1987 | United Kingdom . |
| 1443754 | 10/1992 | United Kingdom . |
| 6959585 | 3/1993 | United Kingdom . |
| 1341438 | 3/1997 | United Kingdom . |
| WO 92/04491 | 3/1992 | WIPO . |

OTHER PUBLICATIONS

K. Loewenstein, The Manufacturing Tecehnology of Continuous Glass Fibres, (3d Ed. 1993), pp. 22–27, 30–44, 47–60, 115–151, 165–173, 219–222, 237–291.

"Waste Fiber Glass Mat", Research Disclosure (Jul. 1996) at p. 409.

U.S. Patent Application No. 08/787,735.

Encyclopedia of Polymer Science and Technology, vol. 6 (1967), pp. 505–712.

*Primary Examiner*—Rich Weisberger
*Attorney, Agent, or Firm*—Ann Marie Cannoni

[57] ABSTRACT

A needled mat adapted to reinforce a thermoplastic matrix material includes (a) a primary layer having a plurality of thermoplastic fibers in an amount greater than about 20 weight percent of the primary layer on a total solids basis, the primary layer being less than about 20 weight percent of the mat on a total solids basis; and (b) a secondary layer having a plurality of discontinuous glass fiber strands and having thereon a strand coating composition which is compatible with the thermoplastic matrix material, the secondary layer being essentially free of individual glass monofilaments.

22 Claims, 7 Drawing Sheets

U.S. PATENT DOCUMENTS

| | | | |
|---|---|---|---|
| 4,948,661 | 8/1990 | Smith et al. | 428/286 |
| 5,011,737 | 4/1991 | Smith et al. | 428/409 |
| 5,017,426 | 5/1991 | Greiser | |
| 5,047,276 | 9/1991 | Chomarat et al. | 428/110 |
| 5,071,608 | 12/1991 | Smith et al. | 264/119 |
| 5,098,624 | 3/1992 | Smith et al. | 264/119 |
| 5,108,678 | 4/1992 | Hirasaka et al. | 264/113 |
| 5,129,131 | 7/1992 | Kimura et al. | 28/107 |
| 5,174,228 | 12/1992 | Grimnes | 112/262.1 |
| 5,194,462 | 3/1993 | Hirasaka et al. | 524/13 |
| 5,380,580 | 1/1995 | Rogers et al. | 428/219 |
| 5,437,928 | 8/1995 | Thimons et al. | 428/391 |
| 5,441,590 | 8/1995 | Ihm et al. | 156/148 |
| 5,540,986 | 7/1996 | Kimura et al. | 428/285 |
| 5,565,049 | 10/1996 | Simmons et al. | 156/62.6 |
| 5,571,610 | 11/1996 | Loftus et al. | 428/285 |
| 5,580,646 | 12/1996 | Jansz et al. | 426/228 |

# GLASS FIBER STRAND MATS, THERMOPLASTIC COMPOSITES REINFORCED WITH THE SAME AND METHODS FOR MAKING THE SAME

FIELD OF THE INVENTION

This invention relates generally to glass fiber mats, thermoplastic composites reinforced with the same and methods for making the same. More particularly, this invention relates to needled mats having a primary layer of thermoplastic fibers and a secondary layer of chopped glass strands, thermoplastic composites reinforced with the same and methods for making the same.

BACKGROUND OF THE INVENTION

An increasingly popular process for forming composites is by compression molding or stamping a moldable sheet of a thermoplastic resin reinforced with fibers such as a glass fiber mat, often referred to as glass mat thermoplastics or "GMT". These composite sheets can be used to form articles such as automobile components and housings for computers.

An example of a commercially successful GMT sheet is the AZDEL® moldable composite sheet which is formed by extruding layers of polypropylene resin sheet with needled mats of continuous glass fiber strand. The AZDEL® composite sheet is commercially available from Azdel, Inc. of Shelby, N.C.

For reinforcing a resin matrix material, U.S. Pat. Nos. 3,664,909, 3,713,962 and 3,850,723 disclose fibrous mats of unstranded filaments which can be layered with reinforcing mats of fiber strands.

U.S. Pat. No. 4,847,140 discloses an insulation medium formed by needling a loose layer of inorganic fibers, such as glass, bonded together by a carrier web which is a blend of inorganic and organic fibers, with the carrier web comprising up to about 10% by weight organic fibers.

U.S. Pat. Nos. 4,948,661, 5,011,737, 5,071,608 and 5,098,624 disclose fiber reinforced thermoplastic molded products produced by intimately blending reinforcing glass fibers and thermoplastic fibers into a web and heating the web to the melting point of the thermoplastic fibers while applying pressure to the web to press the web into a consolidated structure.

There is a long-felt need in the industry for a mat for applications such as GMT which can be readily handled, processed and impregnated by the thermoplastic matrix material, good uniformity of glass distribution and flow into complex mold shapes, low composite viscosity and which provides a composite having good surface smoothness and mechanical properties, such as strength and stiffness.

SUMMARY OF THE INVENTION

One aspect of the present invention is a mat adapted to reinforce a thermoplastic matrix material, the mat comprising: (a) a primary layer comprising a plurality of thermoplastic fibers, the thermoplastic fibers comprising greater than about 20 weight percent of the primary layer on a total solids basis, the primary layer comprising less than about 20 weight percent of the mat on a total solids basis; and (b) a secondary layer comprising a plurality of glass fiber strands, each glass fiber strand having at least about 100 glass fiber monofilaments, the plurality of glass fiber strands having a mean average length ranging from about 20 to about 150 millimeters and having a strand coating composition which is compatible with the thermoplastic matrix material applied to at least a portion of surfaces of the glass fiber strands, the secondary layer being essentially free of individual glass monofilaments and wherein at least a portion of the plurality of thermoplastic fibers of the primary layer and at least a portion of the plurality of glass fiber strands of the secondary layer are entangled by needling.

Another aspect of the present invention is a reinforced polymeric composite comprising: (a) a thermoplastic matrix material; and (b) a reinforcing mat comprising: (1) a primary layer comprising a plurality of thermoplastic fibers, the thermoplastic fibers comprising greater than about 20 weight percent of the primary layer on a total solids basis, the primary layer comprising less than about 20 weight percent of the mat on a total solids basis; and (2) a secondary layer comprising a plurality of glass fiber strands, each glass fiber strand having at least about 100 glass fiber monofilaments, the plurality of glass fiber strands having a mean average length ranging from about 20 to about 150 millimeters and having a strand coating composition which is compatible with the thermoplastic matrix material applied to at least a portion of surfaces of the glass fiber strands, the secondary layer being essentially free of individual glass monofilaments and wherein at least a portion of the plurality of thermoplastic fibers of the primary layer and at least a portion of the plurality of glass fiber strands of the secondary layer are entangled by needling.

Another aspect of the present invention is a method for making a mat adapted to reinforce a thermoplastic matrix material, the method comprising the steps of: (a) positioning a primary layer comprising a plurality of thermoplastic fibers to receive a secondary layer comprising a plurality of glass fiber strands thereon, the thermoplastic fibers comprising greater than about 20 weight percent of the primary layer on a total solids basis, the primary layer comprising less than about 20 weight percent of the mat on a total solids basis; (b) depositing the secondary layer of glass fiber strands upon a first side of the primary layer, each glass fiber strand having at least about 100 glass fiber monofilaments, the plurality of glass fiber strands having a mean average length ranging from about 20 to about 150 millimeters and having a strand coating composition which is compatible with the thermoplastic matrix material applied to at least a portion of surfaces of the glass fiber strands, the secondary layer being essentially free of individual glass monofilaments; and (c) entangling the thermoplastic fibers of the primary layer with the glass fiber strands of the secondary layer by needling the thermoplastic fibers and glass fiber strands together.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE PREFERRED EMBODIMENTS

The mat of the present invention provides numerous advantages in composite forming processes such as GMT, including but not limited to good permeability for impregnation by thermoplastic matrix material, good uniformity of glass distribution and flow into complex mold shapes and which provides a composite having good surface smoothness and mechanical properties, such as tensile, flexural and compressive strength, tensile and flexural modulus and stiffness.

Figure 1:
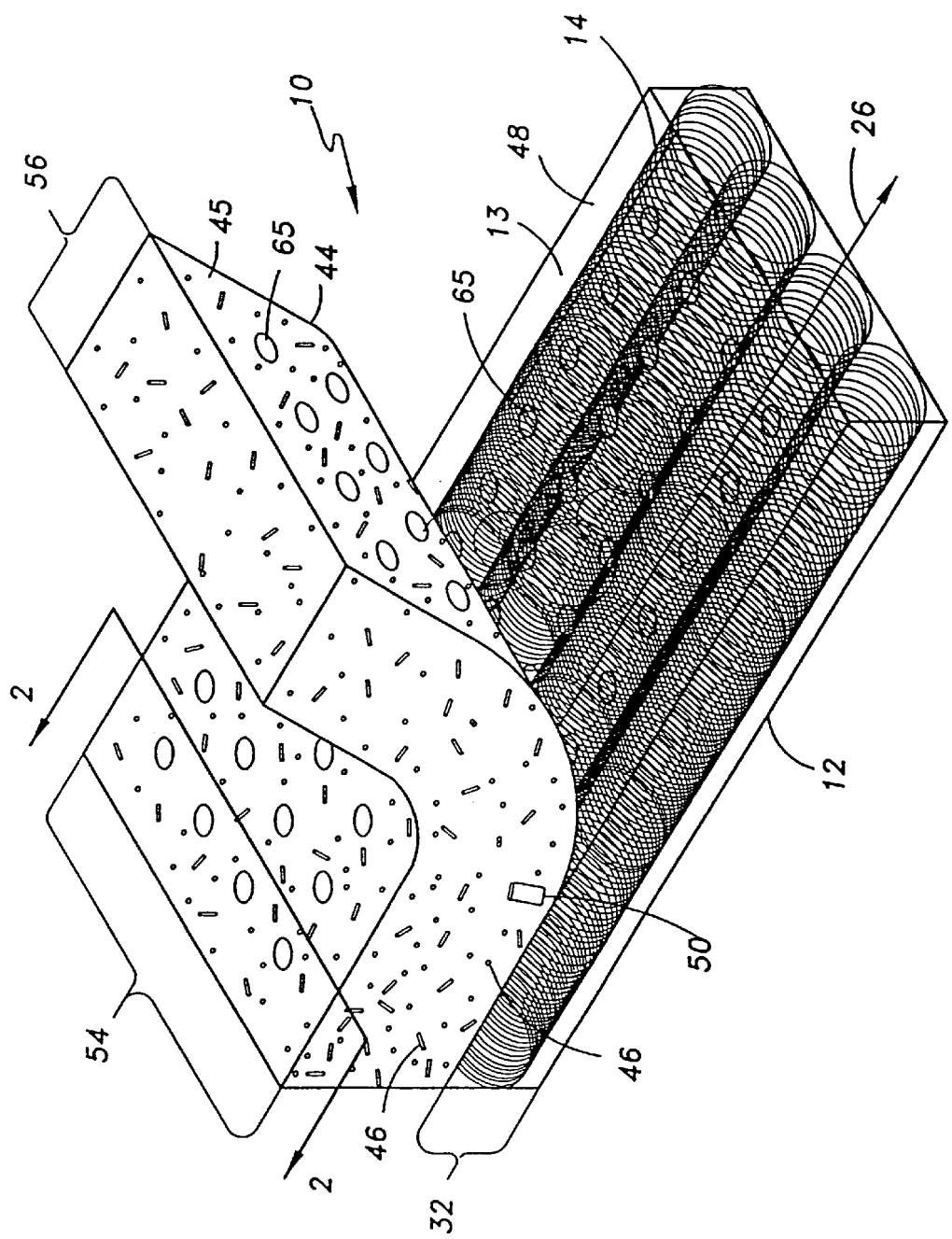
FIG. 1 is an enlarged schematic perspective view of a portion of a mat according to the present invention.
Figure 2:
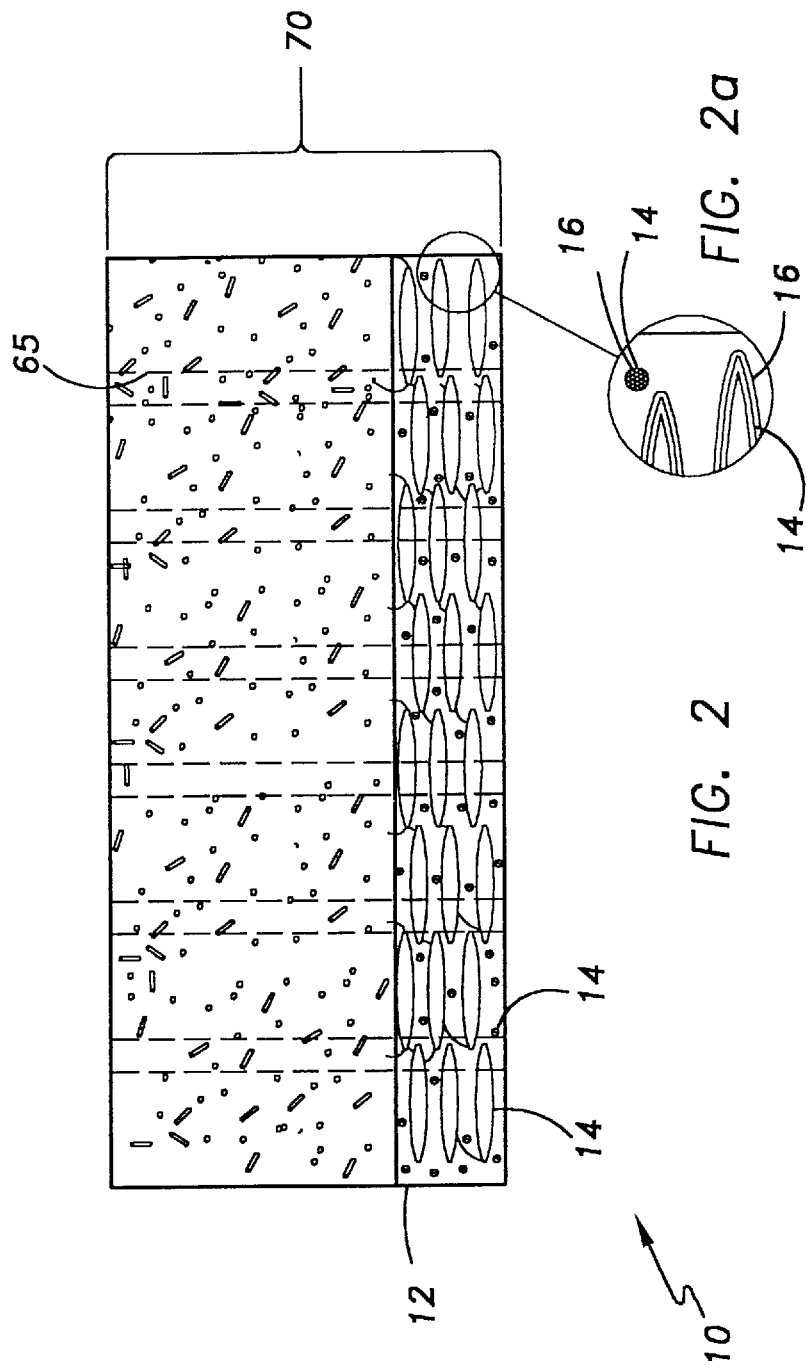
FIG. 2 is a cross sectional view of the mat of FIG. 1, taken along lines 2—2 of FIG. 1.

Referring to the drawings, wherein like numerals indicate like elements throughout, there is shown in FIGS. 1 and 2 a preferred embodiment of a mat, generally designated 10, in accordance with the present invention. The mat 10 comprises a primary, support layer 12 comprising a plurality of randomly oriented discontinuous or preferably generally continuous thermoplastic fibers 14 or strands.

As used herein, the term "fibers" means a plurality of individual monofilaments. The term "strand" as used herein refers to a plurality of monofilaments or fibers which are present in generally parallel cohesive bundles which resist separation from the adjacent fibers of the respective bundle. The glass fiber strands 46 of the secondary layer 44 have at least about 100 generally parallel glass fibers, and preferably about 400 to about 1200 fibers.

As used herein, the phrase "randomly oriented" with respect to the thermoplastic fibers 14 means that the thermoplastic fibers 14 of the primary layer 12 are randomly oriented in at least two dimensions, for example by depositing the thermoplastic fibers 14 onto a carrier or conveyor 34 (shown in FIG. 5) in an random array of layers 20 such as a veil or random loops. Apparatus and methods for forming the primary layer 12 will be discussed in detail below.

As used herein, the phrase "generally continuous" means that the thermoplastic fibers 14 can have a mean average length of about 10 to about 150 kilometers or more. The phrase "discontinuous" means that the thermoplastic fibers 14 can have a mean average length ranging from about 25.4 to about 152.4 millimeters (about 1 to about 6 inches). The thermoplastic fibers 14 can have a nominal filament diameter ranging from about 2.0 to about 30.0 micrometers.

Suitable thermoplastic fibers can be formed from a fibrous or fiberizable material prepared from natural or synthetic organic polymers. Thermoplastic fibers believed to be useful in the present invention are discussed at length in the Encyclopedia of Polymer Science and Technology, Vol. 6 (1967) at pages 505–712, which is hereby incorporated by reference. As used herein, the term "fiberizable" means a material capable of being formed into a generally continuous filament, fiber, strand or yarn. Suitable thermoplastic fibers include those formed from thermoplastic polymers such as polyamides, polyesters, acrylics, polyolefins, polyurethanes, vinyl polymers, derivatives and mixtures thereof. See Encyclopedia of Polymer Science and Technology, Vol. 6 at 506.

Suitable thermoplastic fibers can be formed by a variety of polymer extrusion and fiber formation methods, such as for example drawing, melt spinning, dry spinning, wet spinning and gap spinning. Such methods are well known to those skilled in the art and further discussion thereof is not believed to be necessary in view of the present disclosure. If additional information is needed, such methods are disclosed in Encyclopedia of Polymer Science and Technology, Vol. 6 at 507–508.

Non-limiting examples of useful polyamide fibers include nylon fibers such as nylon 6 (a polymer of caprolactam), nylon 6,6 (a condensation product of adipic acid and hexamethylenediamine), nylon 12 (which can be made from butadiene) and nylon 10, polyhexamethylene adipamide, polyamide-imides and aramids such as KEVLAR™, which is commercially available from E. I. duPont de Nemours, Inc. of Wilmington, Del.

Thermoplastic polyester fibers useful in the present invention include those composed of polyethylene terephthalate and polybutylene terephthalate.

Fibers formed from acrylic polymers believed to be useful in the present invention include polyacrylonitriles having at least about 35% by weight acrylonitrile units, and preferably at least about 85% by weight, which can be copolymerized with other vinyl monomers such as vinyl acetate, vinyl chloride, styrene, vinylpyridine, acrylic esters or acrylamide. See Encyclopedia of Polymer Science and Technology, Vol. 6 at 559–561.

Useful polyolefin fibers are generally composed of at least 85% by weight of ethylene, propylene, or other olefins. See Encyclopedia of Polymer Science and Technology, Vol. 6 at 561–564. Preferably, the thermoplastic fibers 14 are formed from polypropylene.

Fibers formed from vinyl polymers believed to be useful in the present invention can be formed from polyvinyl chloride, polyvinylidene chloride, polytetrafluoroethylene, and polyvinyl alcohol.

Further examples of thermoplastic fiberizable materials believed to be useful in the present invention are fiberizable polyimides, polyether sulfones, polyphenyl sulfones; polyetherketones, polyphenylene oxides, polyphenylene sulfides and polyacetals.

It is understood that blends or copolymers of any of the above materials and combinations of fibers formed from any of the above materials can be used in the present invention, if desired. Also, the thermoplastic fibers 14 can have an antistatic agent coated thereon.

The thermoplastic fibers 14 can comprise greater about 20 to about 100 weight percent of the of the primary layer 12 of the mat 10 on a total solids basis, preferably about 80 to about 100 weight percent, and more preferably about 90 to about 100 weight percent.

Figure 3:
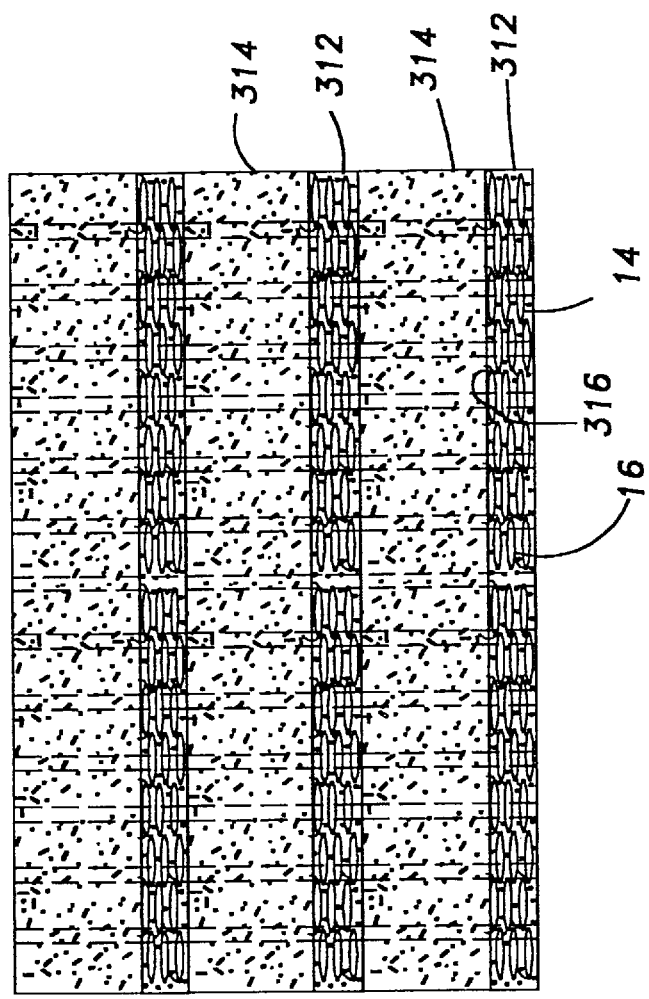
FIG. 3 is a enlarged schematic cross sectional view of an alternative embodiment of a mat according to the present invention

The primary layer 12 can further comprise a plurality of generally continuous or discontinuous natural (for example cotton) or glass fibers or strands 16 (shown in FIG. 3). The characteristics of suitable glass fiber strands 16 are discussed in detail below.

Figure 5:
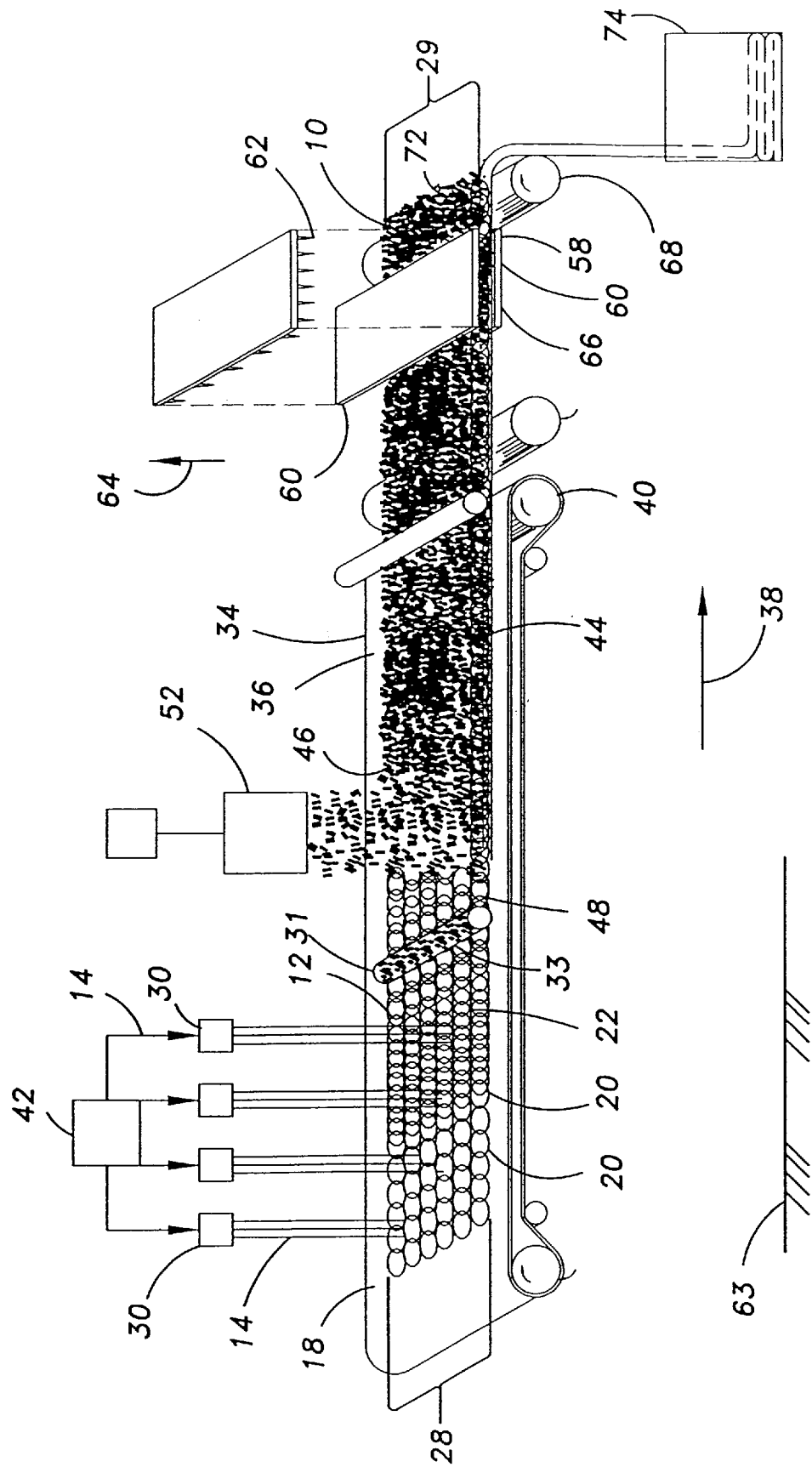
FIG. 5 is a schematic side elevational view of a preferred system for forming a mat according to the present invention.

Referring to FIG. 5, the width 28 of the primary layer 12 (which corresponds generally to the overall width 29 of the mat 10) can range from about 0.5 to about 3 meters, and preferably ranges from about 1.0 to about 2.5 meters.

The length of the primary layer 12 can vary based upon such factors as the desired length of the product to be transported to the customer. The mat 10 is preferably formed by a generally continuous process as discussed below.

Preferably, the length of the primary layer 12 ranges from about 50 to about 300 meters, and more preferably about 180 to about 275 meters.

Referring now to FIG. 1, the thickness 32 of the primary layer 12 can range from about 0.01 to about 3 millimeters, and preferably ranges from about 0.015 to about 0.05 millimeters.

The surface weight of the primary layer 12 of the mat can range from about 30 to about 500 grams per square meter prior to depositing the secondary layer thereon and needling.

The primary layer 12 comprises less than about 20 weight percent of the mat 10 on a total solids basis, preferably about 0.01 to about 20 weight percent, and more preferably about 0.01 to about 5 weight percent.

The preferred primary layer 12 is a polypropylene spun-bonded fiber mat which is commercially available from Fiberweb N.A., Inc. of Simpsonville, S.C. The surface weight of the Fiberweb mat is about 30 grams per square meter and the mat has a thickness of about 0.015 millimeters.

Referring now to FIG. 5, the primary layer 14 can be formed, for example, by positioning a plurality of thermoplastic fiber strand supplies 42 or feeders 30 above a conveyor 34, the surface 36 of which is driven in a direction 38 by a pair of spaced drive rollers 40 which are rotated by a motor (not shown). The surface 36 of the conveyor 34 can be generally smooth or foraminous, such as a chain mesh. Useful conveyors 34 are well known to those skilled in the art and are discussed further below.

The number of strand supplies 42 or strand feeders 30 can range from 1 to about 20, and preferably ranges from about 6 to about 20. Four strand feeders 30 are shown in FIG. 5.

Preferably, the strand supply 42 is a fiber forming apparatus such as, for example, a forming or spinning device for thermoplastic fibers or strands, the methods and apparatus for which are discussed in detail above. The primary layer 12 can include glass fibers or strands such as are discussed in detail below, but preferably includes less than about 5 weight percent glass fibers or strands and more preferably is free of glass fibers or strands.

The primary layer 12 is preferably heated and compacted by a heating device such as an oven or preferably one or more heated compaction rollers 31 which are preferably dimpled 33 to provide point contact heating. One skilled in the art would understand that separate heaters and compaction rollers can be used to heat and compact the primary layer 12, if desired.

Referring now to FIGS. 1 and 5, the mat 10 comprises one or more secondary layers 44 deposited upon an upper surface 48 of the primary layer 12 such that a first side 45 of the secondary layer 44 is adjacent to a second side 13 of the primary layer 12. Each secondary layer 44 comprises a plurality of fiber strands 46 of discontinuous lengths. The fiber strands 46 preferably have a mean average length 50 ranging from about 20 to about 150 millimeters, and more preferably about 25 to about 50 millimeters.

The strands 46 can be formed from one or more materials such as are disclosed above as being suitable for forming the primary layer 12. The strands 46 are preferably glass fiber strands, although the strands can be a combination of glass fiber strands and thermoplastic strand(s) such as are discussed above.

The glass fiber strands 46 are formed from glass filaments, a class of filaments generally accepted to be based upon oxide compositions such as silicates selectively modified with other oxide and non-oxide compositions. Useful glass filaments can be formed from any type of fiberizable glass composition known to those skilled in the art, and include those prepared from fiberizable glass compositions such as "E-glass", "A-glass", "C-glass", "D-glass", "R-glass", "S-glass", and E-glass derivatives that are fluorine-free and/or boron-free. Preferred glass filaments are formed from E-glass. Such compositions and methods of making glass filaments therefrom are well known to those skilled in the art and further discussion thereof is not believed to be necessary in view of the present disclosure. If additional information is needed, such glass compositions and fiberization methods are disclosed in K. Loewenstein, *The Manufacturing Technology of Continuous Glass Fibres,* (3d Ed. 1993) at pages 30–44, 47–60, 115–122 and 126–135, which are hereby incorporated by reference.

The glass fibers of the glass fiber strands 46 can have a nominal filament diameter ranging from about 5.0 to about 30.0 micrometers (corresponding to a filament designation of D through Y), and preferably have a nominal filament diameter ranging from about 13.0 to about 24.0 micrometers (K through T). For further information regarding nominal filament diameters and designations of glass filaments, see *Loewenstein* at page 25, which is hereby incorporated by reference.

The glass fiber strands 46 are preferably essentially free of individual, loose glass monofilaments. As used herein, "essentially free of glass monofilaments" means that the fiber strands 46 comprise less than about 10 weight percent of individual glass monofilaments, preferably less than about 5 weight percent and more preferably are free of glass monofilaments.

The glass fiber strands 46 are present in an amount ranging from at least about 80 weight percent to about 100 weight percent of the secondary layer 44 of the mat 10 on a total solids basis. Preferably, the glass fiber strands 46 are present in an amount ranging from at least about 90 weight percent to about 100 weight percent and, more preferably, about 95 weight percent to about 100 weight percent of the mat 10 on a total solids basis.

The glass fiber strands 46 have a strand coating composition which is compatible with the thermoplastic matrix material 476 applied to at least a portion of surfaces of the glass fiber strands 46, preferably as an essentially dried residue.

Non-limiting examples of suitable coating compositions include sizing compositions and secondary coating compositions. As used herein, the terms "size", "sized" or "sizing" refer to the aqueous composition applied to the fibers immediately after formation. The term "secondary coating" refers to a coating composition applied secondarily to one or a plurality of strands after the sizing composition is applied, and preferably at least partially dried. As used herein, the phrase "compatible with the thermoplastic matrix material" means that the components of the coating composition facilitate wetting of the matrix material upon the fibers or strands and provide adequate physical properties in the composite.

The sizing composition preferably comprises one or more polymeric film forming materials which are compatible with the thermoplastic matrix material. Non-limiting examples of suitable film-forming materials for use in the present invention include thermoplastic materials, thermosetting materials and mixtures thereof.

Examples of suitable thermoplastic and thermosetting film-forming materials include acrylic polymers, aminoplasts, alkyds, polyepoxides, phenolics, polyamides, polyolefins, polyesters, polyurethanes, vinyl polymers, derivatives and mixtures thereof.

Useful acrylic polymers include polymers or copolymers of monomers such as acrylic acid; methacrylic acid; esters of these acids such as acrylates, methacrylates, ethylacrylate, propylacrylate and butylacrylate; polyglycidyl acrylates and methacrylates; acrylamides; acrylonitriles; and copolymers with unsaturated vinyl compounds such as styrene or vinyl acetate. Non-limiting examples of suitable acrylic polymers include FULATEX materials which are commercially available from H. B. Fuller Co. of St. Paul, Minn.; RHOPLEX acrylic emulsions which are commercially available from Rohm and Haas of Philadelphia, Pa.; and CARBOSET acrylic polymers which are commercially available from B.F. Goodrich Co. of Toledo, Ohio.

Useful aminoplasts include urea-formaldehyde and melamine formaldehyde. Useful epoxides contain at least one epoxy or oxirane group in the molecule, such as polyglycidyl ethers of polyhydric alcohols or thiols. Useful polyglycidyl ethers of polyhydric alcohols can be formed by reacting epihalohydrins and/or butadiene dioxide with polyhydric alcohols, such as dihydric alcohols, in the presence of an alkali condensation and dehydrohalogenation catalyst such as sodium hydroxide or potassium hydroxide. Examples of suitable commercially available epoxy filmforming polymers are EPON® 826 and 828 epoxy resins, which are epoxy functional polyglycidyl ethers of bisphenol A prepared from bisphenol-A and epichlorohydrin and are commercially available from Shell Chemical.

Useful polyamides include the VERSAMID products which are commercially available from General Mills Chemicals, Inc. Suitable thermoplastic polyurethanes are condensation products of a polyisocyanate material and a hydroxyl-containing material such as polyol and include, for example, WITCOBOND® W-290H which is commercially available from Witco Chemical Corp. of Chicago, Ill. and RUCO 2011L which is commercially available from Ruco Polymer Corp. of Hicksville, N.Y. Suitable thermosetting polyurethanes include BAYBOND XW-110, which is commercially available from Bayer Corp. of Pittsburgh, Pa.

Non-limiting examples of useful vinyl polymers include RESYN 1971, RESYN 2828 and RESYN 1037 vinyl acetate copolymer emulsions which are commercially available from National Starch and Chemicals of Bridgewater, N.J. Other useful vinyl polymers include polyvinyl pyrrolidones such as PVP K-15, PVP K-30, PVP K-60 and PVP K-90 which are commercially available from ISP Chemicals of Wayne, N.J.

Non-limiting examples of useful polyolefins include polypropylene and polyethylene materials such as the polypropylene emulsion RL-5440, which is commercially available from Sybron Chemicals of Birmingham, N.J., and Polyemulsion CHEMCOR 43C30, which is commercially available from Chemical Corp. of America.

Non-limiting examples of useful polyester materials include RD-847A polyester resin which is commercially available from Borden Chemicals of Columbus, Ohio, STYPOL polyesters which are commercially available from Cook Composites and Polymers of Port Washington, Wis. and NEOXIL polyesters which are commercially available from DSM B.V. of Como, Italy. Thermoplastic polyesters useful in the present invention include ethylene adipates (such as DESMOPHEN 2000) and ethylene butylene adipates (such as DESMOPHEN 2001KS), both of which are commercially available from Bayer.

Preferred film-forming materials include a thermosetting urethane-modified polyglycidyl ether of bisphenol A emulsion which is commercially available as EPI-REZ® W60 5520 from Shell Chemical Company of Houston, Tex. and a maleic anhydride-modified polypropylene emulsion which is commercially available as Protolube RL-5440 from National Starch and Chemical Co. of Bridgewater, N.J.

The amount of film-forming material can be about 1 to about 90 weight percent of the sizing composition on a total solids basis, and is preferably about 60 to about 80 weight percent.

The sizing composition preferably comprises one or more glass fiber lubricants. Useful glass fiber lubricants include cationic, non-ionic or anionic lubricants and mixtures thereof. Generally, the amount of fiber lubricant can be about 1 to about 25 weight percent of the sizing composition on a total solids basis.

Non-limiting examples of such fiber lubricants include amine salts of fatty acids (which can, for example, include a fatty acid moiety having 12 to 22 carbon atoms and/or tertiary amines having alkyl groups of 1 to 22 atoms attached to the nitrogen atom), alkyl imidazoline derivatives (such as can be formed by the reaction of fatty acids with polyalkylene polyamines), acid solubilized fatty acid amides (for example, saturated or unsaturated fatty acid amides having acid groups of 4 to 24 carbon atoms such as stearic amide), condensates of a fatty acid and polyethylene imine and amide substituted polyethylene imines, such as EMERY® 6717, a partially amidated polyethylene imine commercially available from Henkel Corporation of Kankakee, Ill.

The sizing composition preferably also comprises one or more coupling agents. These coupling agents typically have dual functionality. Each metal or silicon atom has attached to it one or more groups which can react or compatibilize with the glass filament surface and/or the components of the sizing composition. As used herein, the term "compatibilize" with respect to coupling agents means that the groups are chemically attracted, but not bonded, to the glass filament surface and/or the components of the sizing composition, for example by polar, wetting or salvation forces. Examples of hydrolyzable groups include:

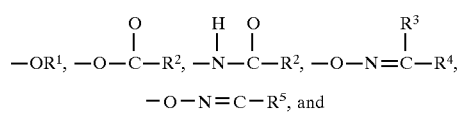

the monohydroxy and/or cyclic $C_2$–$C_3$ residue of a 1,2- or 1,3 glycol, wherein $R^1$ is $C_1$–$C_3$ alkyl; $R^2$ is H or $C_1$–$C_4$ alkyl; $R^3$ and $R^4$ are independently selected from H, $C_1$–$C_4$ alkyl or $C_6$–$C_8$ aryl; and $R^5$ is $C_4$–$C_7$ alkylene. Examples of suitable compatibilizing or functional groups include epoxy, glycidoxy, mercapto, cyano, allyl, alkyl, urethano, halo, isocyanato, ureido, imidazolinyl, vinyl, acrylato, methacrylato, amino or polyamino groups.

Functional organo silane coupling agents are preferred for use in the present invention. Examples of suitable functional organo silane coupling agents include A-187 gammaglycidoxypropyltrimethoxysilane (preferred), A-174 gamma-methacryloxypropyltrimethoxysilane and A-1100 gamma-aminopropyltriethoxysilane silane coupling agents, each of which are commercially available from OSi Specialties, Inc. of Tarrytown, N.Y. The organo silane coupling agent can be at least partially hydrolyzed with water prior to application to the glass filaments, preferably at about a 1:3 stoichiometric ratio or, if desired, applied in unhydrolyzed form. The amount of coupling agent can be 1 to about 10 weight percent of the sizing composition on a total solids basis.

Crosslinking materials, such as the aminoplasts discussed above, can also be included in the sizing composition. Non-limiting examples of suitable crosslinkers include melamine formaldehyde, blocked isocyanates such as BAYBOND XW 116 or XP 7055, epoxy crosslinkers such as WITCOBOND XW by Witco Corp., and polyesters such as BAYBOND XP-7044 or 7056 which are commercially available from Bayer. The amount of crosslinker can be about 1 to about 25 weight percent of the sizing composition on a total solids basis.

The sizing composition can comprise one or more emulsifying agents for emulsifying components of the sizing composition. Non-limiting examples of suitable emulsifying agents or surfactants include polyoxyalkylene block copolymers, ethoxylated alkyl phenols, polyoxyethylene octylphenyl glycol ethers, ethylene oxide derivatives of sorbitol esters and polyoxyethylated vegetable oils. Generally, the amount of emulsifying agent can be about 1 to about 20 weight percent of the sizing composition on a total solids basis.

The sizing composition can also include one or more aqueous dispersible or soluble plasticizers to improve flexibility. Examples of suitable non-aqueous-based plasticizers which are aqueous dispersible plasticizers include phthalates, trimellitates and adipates. An example of an aqueous soluble plasticizer is CARBOWAX 400, a polyethylene glycol which is commercially available from Union Carbide of Danbury, Conn. The amount of plasticizer is more preferably less than about 5 weight percent of the sizing composition on a total solids basis.

The coating composition preferably includes a polymeric amine such as ALUBRASPIN 230 tetraethylene pentamine chain-extended with diethyl succinate and octanoic acid to a molecular weight of about 1500, which is commercially available from PPG Industries, Inc. of Pittsburgh, Pa.

Fungicides, bactericides and anti-foaming materials and organic and/or inorganic acids or bases in an amount sufficient to provide the aqueous sizing composition with a pH of about 2 to about 10 can also be included in the sizing composition. Water (preferably deionized) is included in the sizing composition in an amount sufficient to facilitate application of a generally uniform coating upon the strand. The weight percentage of solids of the sizing composition generally can be about 4 to about 20 weight percent.

Preferred sizing compositions are disclosed in assignee's U.S. Pat. No. 5,437,928, which is hereby incorporated by reference. Non-limiting examples of other suitable sizing compositions are set forth in *Loewenstein* at pages 237–291, which are hereby incorporated by reference.

The sizing can be applied in many ways, for example by contacting the fibers with a static or dynamic applicator, such as a roller or belt applicator, spraying or other means. For a discussion of suitable applicators, see *Loewenstein* at pages 165–172, which is hereby incorporated by reference.

The sized fibers are preferably dried at room temperature or at elevated temperatures to remove excess moisture from the fibers and, if present, cure any curable sizing or secondary coating composition components. Drying of glass fiber forming packages or cakes is discussed in detail in *Loewenstein* at pages 219–222, which is hereby incorporated by reference. For example, the forming package can be dried in an oven at a temperature of about 104° C. (220° F.) to about 160° C. (320° F.) for about 10 to about 24 hours to produce glass fiber strands having a dried residue of the composition thereon. The temperature and time for drying the glass fibers will depend upon such variables as the percentage of solids in the sizing composition, components of the sizing composition and type of glass filament. The sizing is typically present on the fibers in an amount ranging from about 0.3 percent to about 1.5 percent by weight after drying.

After drying the sized glass fibers can be gathered together into bundles or strands 46 of generally parallel fibers or roving and can be further treated with the secondary coating composition which is different from the sizing composition. The secondary coating composition can include one or more of the components of the sizing composition discussed above, and is preferably aqueous-based.

Preferably the glass fiber strands 46 are formed from generally continuous strands which are chopped into discontinuous or discrete lengths 50 by a chopper 52. As shown in FIG. 5, the chopper 52 can be positioned proximate the conveyor 34 at a predetermined distance from the strand supply 42 or feeders 30 in the direction 38 such that chopped strands 46 ejected from the chopper 52 are deposited upon the upper surface 48 of the primary layer 12 of generally continuous strands 14. Alternatively, the strands 46 can be chopped at a location spaced apart from and remote to the mat forming apparatus and transported to the mat forming apparatus.

In an alternative embodiment, the strand supply 18 comprises a fiber forming apparatus which comprises a glass melting furnace or forehearth containing a supply of a fiber forming mass or molten glass and having a precious metal bushing or spinneret attached to the bottom of the forehearth. The bushing is provided with a series of orifices in the form of tips through which molten glass is drawn in the form of individual fibers or monofilaments at a high rate of speed. Such fiber forming apparatus are well known to those skilled in the art and further discussion thereof is not believed to be necessary in view of the present disclosure. Suitable fiber forming apparatus are discussed in *Loewenstein* at pages 22–27 and 119–151, which are hereby incorporated by reference.

The glass fibers can be cooled by spraying with water and coated with a sizing by an applicator as discussed above. After application of the sizing, the glass fibers are gathered by an alignment device which aligns each of the filaments to form one or more strands 46 in which each of the fibers is generally adjacent and coplanar (in side-by-side or generally parallel alignment). Non-limiting examples of suitable alignment devices include rotatable or stationary gathering shoes or a comb, as discussed in *Loewenstein* at page 173, which is hereby incorporated by reference. Preferably, the number of strands ranges from 1 to about 10 strands and, more preferably, 1 to about 6 strands.

The width 54 of the secondary layer 44 (which can be greater than or correspond generally to the overall width 29 of the mat 10) can range from about 0.5 to about 3 meters, and preferably ranges from about 1.0 to about 2.5 meters. The length of the secondary layer 12 corresponds generally to the length of the primary layer 12.

The thickness 56 of the secondary layer 44 can range from about 3 to about 25 millimeters prior to needling. The surface weight of the secondary layer 44 of the mat 10 can range from about 200 to about 1200 grams per square meter prior to needling.

Preferably the chopper 52 dispenses about 0.5 to about 12 grams of strand 14 per minute per linear millimeter width (about 5 to about 120 ounces per minute per linear foot width). The amount of chopped strand 46 per unit area deposited upon the primary layer 12 is also a function of the conveyor speed.

A non-limiting example of a suitable chopper 34 is the Model 90 chopper which is commercially available from Finn and Fram, Inc. of California.

The mat 10 comprising the primary layer 12 and secondary layer 44 has a mat surface weight greater than about 200 grams per square meter prior to needling. Preferably, the mat surface weight ranges from about 500 to about 1300 grams per square meter prior to needling.

Referring now to FIG. 1, the overall width of the mat 10 can range from about 0.5 to about 3 meters, and preferably ranges from about 1.0 to about 2.5 meters.

The length of the mat 10 can vary based upon such factors as the desired length of the product to be transported to the customer. The mat is preferably formed by a generally continuous process as discussed below. Preferably, the length of the mat 10 ranges from about 60 to about 300 meters (about 200 to about 1000 feet), and more preferably about 180 to about 275 meters (about 600 to about 900 feet).

Referring now to FIG. 3, there is shown a mat 310 comprising alternating primary layers 312 and secondary layers 314. Such a mat 310 can be formed by forming a mat 10 having a primary layer 12 and secondary layer 44 such as discussed above and stacking a plurality of mats 10 prior to needling, for example.

The number of primary layers 312 and secondary layers 314 can vary as desired, and can be a function of cost and the desired overall mat thickness. The number of layers 312, 314 can range from 1 to about 5. Three primary layers 312 and three secondary layers 314 are shown in FIG. 3. Alternatively, the mat 310 can comprise a different number of primary layers 312 than secondary layers 314, so long as at least one secondary layer 314 is positioned upon the upper surface 316 of at least one primary layer 312 since the primary layer 312 provides support for the mat 310 during transportation.

Figure 6:
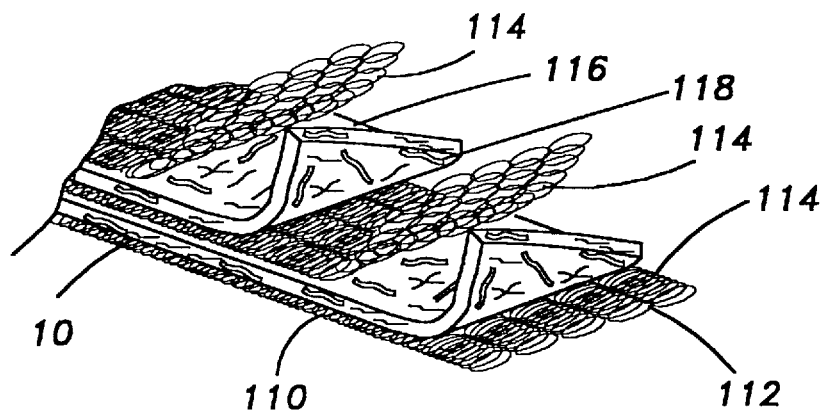
FIG. 6 is an enlarged schematic perspective view of another alternative embodiment of a mat according to the present invention.

In an alternative embodiment shown in FIG. 6, the mat 110 can further comprise one or more layers 114 of a plurality of randomly oriented essentially continuous glass fibers 112 positioned within the mat 10, adjacent the top side 116 and/or adjacent the bottom side 118 of the mat 10. As used herein, the phrase "essentially continuous" means that the glass fibers 112 have a mean average length greater than about 10 meters up to about 150 kilometers or more, and preferably about 10 to about 1000 meters. Suitable glass compositions and nominal filament diameters are discussed in detail above.

Figure 7:
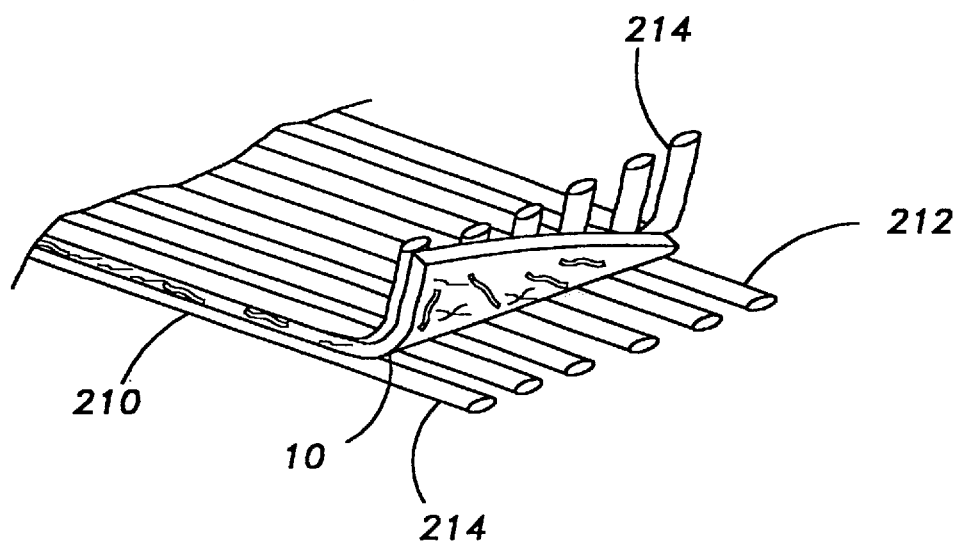
FIG. 7 is an enlarged schematic perspective view of another alternative embodiment of a mat according to the present invention.

In another alternative embodiment shown in FIG. 7, the mat 210 can further comprise a plurality of unidirectional essentially continuous glass fiber strands 212 and the mat 10. As used herein, the term "unidirectional" means that the essentially continuous glass fiber strands 212 are positioned in one or more layers 214 in generally parallel alignment along the longitudinal axis of the mat 10.

Figure 8:
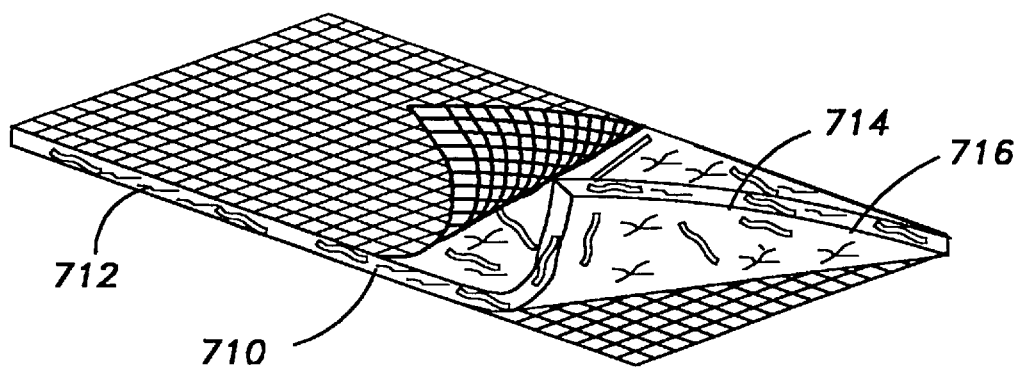
FIG. 8 is an enlarged schematic perspective view of another alternative embodiment of a mat according to the present invention.

In another alternative embodiment shown in FIG. 8, the mat 710 can further comprise one or more fabrics 712 positioned within the mat 10, adjacent the top side 714 and/or adjacent the bottom side 716 of the mat 10. The fabric 712 can be formed from glass fibers, thermoplastic fibers and/or thermosetting fibers such as are discussed below. The fabric 712 can be formed as a nonwoven or woven material. A non-limiting example of a suitable nonwoven is a material formed from a slurry of discrete or noncontinuous fibers. Suitable woven materials include those formed by weaving or knitting.

Figure 9:
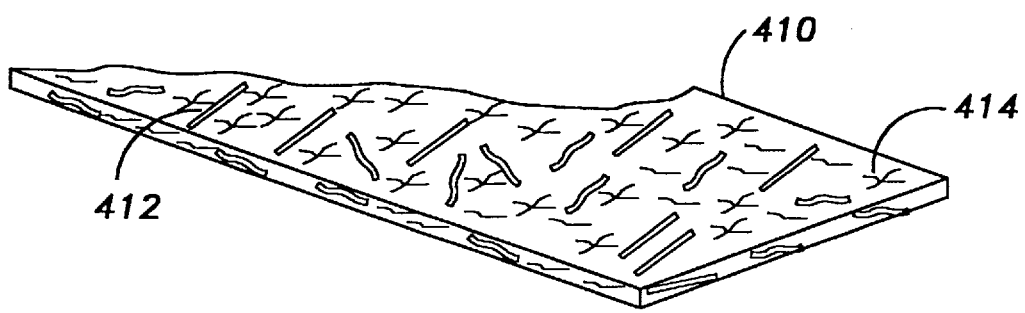
FIG. 9 is an enlarged schematic perspective view of another alternative embodiment of a mat according to the present invention.

In another alternative embodiment shown in FIG. 9, the secondary layer of the mat 410 further comprises a plurality of generally continuous or discrete fibers and/or strands 412 formed from a material selected from the group consisting of thermoplastic materials and thermosetting materials discussed in detail above, in addition to the glass fiber strands 414.

Referring now to FIGS. 1 and 2, the mat 10 can be treated or coated with an adhesive or polymeric binder material to promote consolidation of the mat prior to or after needling, although use of a binder is not preferred. Non-limiting examples of useful polymeric binders include polyvinyl acetate, polyesters and polypropylene. Suitable polymeric binders can be in the form of a powder, fiber or emulsion, as desired. The binders are consolidated with the mat by the application of heat and pressure, such as by passing the mat between heated calendering rolls.

The mat 10 is conveyed to the needler 58 by the conveyor 38. Any conventional conveyor, such as a chain or mesh conveyor, can be used to transport the mat 10 to the needler 58.

Prior to needling, the mat 10 can be combined with unidirectional glass, thermoplastic or thermosetting fiber strands and/or fabrics such as are discussed above. The unidirectional strands can be fed from a creel having a plurality of supply packages to align the unidirectional strands in generally parallel and coplanar alignment. The unidirectional strands and/or fabric can be positioned between layers of the mat 10 or adjacent the top or bottom side of the mat 10, as desired.

Referring now to FIG. 5, the thermoplastic fibers 14 of the primary layer 12 and glass fiber strands 46 of the secondary layer 44 of the mat 10 are entangled 59 by needling the thermoplastic fibers 14 and glass fiber strands 46 (and any unidirectional strands or fabric, if present) together. The needling can be accomplished by passing the mat 10 through a needler 58 between generally known spaced needling boards 60, such as are disclosed in assignee's U.S. Pat. No. 4,277,531, which is hereby incorporated by reference.

A plurality of spaced needles 62 are used to entangle or intertwine the thermoplastic fibers 14 and glass fiber strands 46 of the mat 10 to impart mechanical strength and integrity to the mat 10. The needles 62 are constructed and arranged with a barb which entangles the thermoplastic fibers 14 and glass fiber strands 46 contained in the mat 10 as the barb passes through the mat forming aperture on the downward stroke of the vertical reciprocation of the needles 62 and preferably release the thermoplastic fibers 14 and glass fiber strands 46 contained within the mat 10 during the upward stroke of the reciprocating needler 58. Alternatively, needles 62 with reverse barbs can be used to form the mat 10 of the present invention.

As used herein, the term "horizontal(ly)" means that the direction of movement is generally parallel with respect to ground. As used herein, the terms "vertical(ly)", "downwardly" and "upwardly" refer to direction of movement which is generally perpendicular with respect to ground.

During vertical upward movement 64, the needles 62 are passed through a plurality of generally cylindrical orifices in a metal stripper plate (not shown for clarity in the drawings) which rests upon the mat 10 during its passage through the needler 58. The thermoplastic fibers 14 and glass fiber strands 46 are thus pulled from the surface of the barb as the mat 10 proceeds in horizontal direction after a stroke of the needle 62 in a downward and upward direction. The mat 10 passes over a metal bed plate 66 having a plurality of generally cylindrical orifices therethrough aligned with the orifices of the stripper plate through which the needles 62 pass on the downward stroke of the needleboard.

The needleboard 60 can be reciprocated such that a full stroke (downward and upward motion) occurs in a period of about 100 to about 1000 strokes per minute and upon completion of each reciprocation rolls 68 are provided in association with the needler 58 to move the mat 10 in generally horizontal direction in preparation for the successive downward stroke of the needleboard 60. A non-limiting example of a suitable needling machine is Model NL 9 which is commercially available from Textilmaschinenfabrik Dr. Ernest Fehrer AG of Germany.

The length of the needle 62, the depth of the penetration of the needle 62 through the mat 10 during its passage through the needler 58 and the extent to which the thermoplastic fibers 14 and glass fiber strands 46 entangled in the barb of the needle 62 are moved in a generally vertical upward direction 64 through the mat 10 during the upward stroke of the needler 58 determine the extent to which impact strength can be imparted to the composite 470 (shown in FIG. 4) incorporating the mat 10 as reinforcement.

Preferably, the gauge of the needle 62 ranges from about 32 to about 19 gauge, with a combination of 25 and 32 gauge needles being preferred. The punch density is preferably about 12 to about 62 punches per square centimeter (about 75 to about 400 punches per square inch).

The punching depth or degree of penetration of the needles 62 into the orifices of the bed plate 66 preferably ranges from about 12 to about 18 millimeters (about 0.5 to about 0.7 inches). In a typical needling process, the mat 10 entering the needler 58 can have an overall average thickness of about 8 to about 100 millimeters. After passage throughout the needler 58, the mat 10 can have a compressed overall average thickness of about 3 to about 20 millimeters (about 0.125 to about 0.75 inches). The needling process is described in further detail in assignee's U.S. Pat. No. 4,335,176, which is hereby incorporated by reference.

The surface weight of the mat 10 after needling can range from about 200 to about 1300 grams per square meter. The overall width 29 of the mat 10 can range from about 0.6 to about 3 meters (about 24 to about 120 inches), and preferably ranges from about 1.2 to about 2.4 meters (about 48 to about 96 inches).

Figure 4:
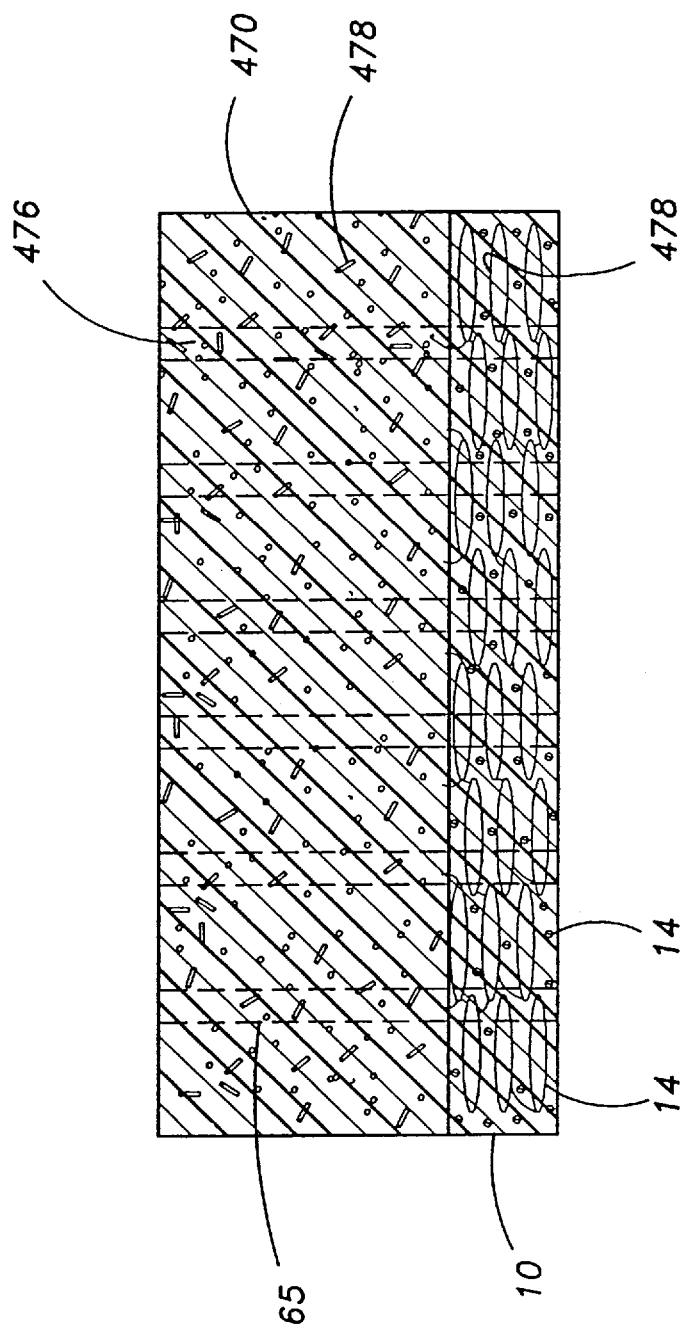
FIG. 4 is an enlarged schematic cross sectional view of a composite according to the present invention.

An advantage of such a mat is that it can be readily handled after formation and packaged in a convenient form for transportation to a customer. For example, as shown in FIG. 4, the mat 10 can be rolled to form a roll 72 or festooned or severed into predetermined lengths and packaged in a conventional container 74 of suitable dimensions for shipment to the customer.

The mat 10 can be used to reinforce a thermoplastic matrix material 476 to form a polymeric composite 470. Non-limiting examples of suitable polymeric thermoplastic materials include polyolefins, polyamides, thermoplastic polyurethanes, thermoplastic polyesters, acrylic polymers, vinyl polymers, derivatives and mixtures thereof.

Non-limiting examples of useful polyolefins include polyethylene, extended-chain polyethylene, polypropylene, polybutene, polyisoprene, and polypentene, polymethyl pentene, polytetrafluoroethylene and neoprene. Preferably the thermoplastic matrix material 16 is polypropylene.

Useful polyamides include nylons such as nylon 6 (a polymer of caprolactam), nylon 12 (which can be made from butadiene), nylon 66 (a condensation product of adipic acid and hexamethylenediamine), nylon 10 and nylon 12 such as are commercially available from DuPont. Other examples of useful polyamides include polyhexamethylene adipamide and aramids such as Kevlar™, which is commercially available from duPont.

Suitable thermoplastic polyurethanes are condensation products of a polyisocyanate material and a hydroxyl-containing material such as polyol and include, for example, Estane and Texin polyurethanes which are commercially available from B.F. Goodrich of Toledo, Ohio and Bayer, respectively.

Thermoplastic polyesters useful in the present invention include polyethylene terephthalate and polybutylene terephthalate. Acrylic polymers useful in the present invention include polyacrylates, polyacrylamides and polyacrylonitriles such as nitrile rubber.

Useful vinyl polymers include polyvinyl chloride, polyvinylidene chloride (saran), polyvinyl fluoride, polyvinylidene fluoride, ethylene vinyl acetate copolymers, such as Elvax which is commercially available from duPont, and polystyrenes.

Thermoplastic elastomeric materials useful as matrix materials in the present invention include styrene-butadiene rubbers, styrene-acrylontrile (SAN) copolymers such as Lustran, which is commercially available from Monsanto of St. Louis, Miss., styrene-butadiene-styrene (SBS) copolymers and acrylonitrile-butadiene-styrene (ABS) copolymers, such as Cycolac or Blendex, which are commercially available from GE Plastics of Pittsfield, Mass.

Further examples of useful thermoplastic materials include polyimides including polyether imides such as Ultem, which is commercially available from GE Plastics; polyether sulfones, such as Victrex which is commercially available from ICI Americas, Inc. of Wilmington, Del.; polyphenyl sulfones such as Radel R which is believed to be commercially available from Amoco; polyetherketones including polyetheretherketones (PEEK) such as Ultra Pec, which is commercially available from BASF Corp. of Parsippany, N.J.; polyphenylene oxides such as Noryl, which is commercially available from G.E. Plastics; polyphenylene sulfides such as Ryton R which is commercially available from Phillips Chemical Co. of Houston, Tex.; polyacetals such as Celcon, which is commercially available from Hoechst Celanese Corp. of Chatham, N.J.; polyvinyl chlorides; and polycarbonates such as Lexan, which is commercially available from G.E. Plastics, and Makrolon, which is commercially available from Bayer. Also included as suitable thermoplastic materials are any of the above thermoplastics which are modified by an unsaturated monomer.

Other components which can be included with the thermoplastic matrix material and mat 10 in the composite are, for example, colorants or pigments, lubricants or process aids, ultraviolet light (UV) stabilizers, antioxidants, other fillers, and extenders.

The thermoplastic matrix material 16 can be formed into a composite 120 with the mat 10 by a variety of methods which are dependent upon such factors as the type of thermoplastic matrix material 16 used. The composite 120 can be formed by first forming a laminate by the mat 10 and thermoplastic matrix material 16 and then compression molding or stamping the laminate. To form the laminate the thermoplastic matrix material 16 can be impregnated into the mat 10 and then the impregnated mat can be heated in a oven, such as a conventional continuous oven well known to those skilled in the art, at a temperature of about 190° C. to about 240° C. for about 7 minutes. The laminate can be transferred to a mold and heated under pressure to a temperature which can vary based upon the resin selected. For example, for polypropylene, the molding temperature can be about 65° C. The pressure for forming such a laminate can be about 14 megaPascals. One skilled in the art would understand that the laminating and molding temperatures and pressure can vary based upon such factors as the dimensions and structure of the composite to be formed and the thermoplastic matrix material.

A method according to the present invention for making a mat adapted to reinforce a thermoplastic matrix material will now be described generally.

With reference to FIG. 5, the method generally comprises the initial step of dispersing a plurality of generally continuous thermoplastic fibers 14 to form a primary layer 12, such that the thermoplastic fibers 14 of the primary layer 12 are randomly oriented as discussed above. The fibers 14 are preferably dispersed by one or more spinners in a manner such as is discussed in detail above.

A plurality of chopped glass fiber strands 46 is dispersed upon the upper surface 48 of the primary layer 12, the strands 46 having a mean average length such as is discussed above. The strands 46 can be dispersed onto the primary layer 12 from a chopper 52 in a manner such as is discussed in detail above.

The essentially continuous thermoplastic fibers 14 of the primary layer 12 are entangled with the chopped glass fiber strands 46 of the secondary layer 44 by needling the layers 12, 44 together to form the mat 10, 410. Suitable needlers and the methods for needling are discussed in detail above.

A method according to the present invention for reinforcing a thermoplastic matrix material to form a reinforced composite will now be described generally. The method generally comprises the initial step of coating and impregnating at least a portion of the mat discussed above with a thermoplastic matrix material. The thermoplastic matrix material is heated to a temperature sufficient to permeate the mat and is cooled to ambient temperature to provide a reinforced thermoplastic composite.

The present invention will now be illustrated by the following specific, non-limiting example.

EXAMPLE

An aqueous sizing composition prepared according to U.S. Pat. No. 5,437,928 was applied to N filament E-glass fibers and the fibers were gathered into bundles of about 800 fibers per bundle, wound onto individual forming packages and chopped into lengths of about 25.4 millimeters (about 1 inch) and about 50.8 millimeters (about 2 inches) in a manner similar to that discussed above in the specification. The weight of sizing composition on the fibers after drying the forming package at a temperature of about 140° C. for about 10 hours (loss on ignition) was about 0.55 weight percent.

The above glass strands were dispensed as a secondary layer onto a primary layer of (1) FIBERWEB polypropylene spun-bonded fiber mat, which is commercially available from Fiberweb N.A., Inc. of Simpsonville, S.C. having a surface weight of about 30 grams per square meter and a thickness of about 0.015 millimeters; or (2) homopolymer polypropylene film[1] having a surface weight of about 30 grams per square meter and a thickness of about 0.015 millimeters.

[1] FP-200 homopolymer polypropylene film which is commercially available from Palstics Suppliers Inc. of Columbus, Ohio.

Each mat was needled using a Morrison needler having either 25 or 19 gauge needles, as specified in Table 1, at a punch density of about 21.7 punches per square centimeter (about 140 punches per square inch) to a depth of about 14 millimeters (about 0.55 inches).

Two types of mats ("A" and "B") were produced from each sample. Mat type A had a mat surface weight of about 660 grams per square meter (about 2.2 ounces per square foot) and a thickness of about 9.12 millimeters (about 0.359 inches). Mat type B had a mat surface weight of about 870 grams per square meter (about 2.9 ounces per square foot) and a thickness of about 9.35 millimeters (about 0.368 inches).

The mats were laminated, stamped and molded into composites with various polypropylene thermoplastic matrix materials as set forth below.

Two layers of each Sample of Mat type A were laminated in alternating layers between three sheets of BOREALIS 100 MF (melt flow index of 100 according to ASTM D3835-79 (1983)) polypropylene[2]. Each of these laminates (Examples 1A through 8A) contained about 30 weight percent glass on a total solids basis. Two layers of each Sample of Mat type B were laminated in alternating layers between three sheets of BOREALIS 400 MF (melt flow index of 400 according to ASTM D3835-79 (1983)) polypropylene[3]. Each of these laminates (Examples 1B through 8B) contained about 40 weight percent glass on a total solids basis.

[2] BOREALIS 100 MF (Melt Flow Index) polypropylene is commercially available from Ashland Chemical Co. of Dublin, Ohio.
[3] BOREALIS 400 MF (Melt Flow Index) polypropylene is commercially available from Ashland Chemical Co. of Dublin, Ohio.

The laminates were prepared using a Wabash Laminator which is commercially available from Wabash Metal Products, Inc. of Wabash, Ind. The laminates were formed at a temperature of about 199° C. (about 390° F.), a pressure of about 71 Pascals (about 10.33 pounds per square inch) for about 180 seconds. The dimensions of each laminate formed were about 559 millimeters in width, about 559 millimeters in length and about 3.81 millimeters thick (about 22 inches in width, about 22 inches in length and about 0.15 inches thick).

The laminates were trimmed to about 229 millimeters (about 9 inches) width and about 229 millimeters (about 9 inches) length each, stacked into two layers and compression molded (stamped) using a Lawton 500T molding apparatus which is commercially available from Lawton, C. A., Co. of De Pere, Wis. The laminates were preheated in the mold at a temperature of about 204° C. (about 400° F.) for about 72 seconds and molded at a temperature of about 49° C. (about 120° F.) and pressure of about 21 kiloPascals (about 2995 pounds per square inch) for about 30 seconds to form about 317.5 millimeters width, 317.5 millimeters length and 3.175 millimeters thickness (about 12.5 inch width, 12.5 inch length and 0.125 inch thickness) composite plaques.

Each plaque was evaluated for: tensile strength according to ASTM Method D-638-92; Izod impact strength according to ASTM Method D-256-92; and Dynatup Impact according to ASTM Method D3029-90. Each of the results for tensile strength, Izod impact strength and Dynatup impact strength is the average value calculated from results evaluated for testing of the selected property in the machine direction and tensile direction. The results of these evaluations are set forth in Tables 1 and 2.

TABLE 1

| EXAMPLE | Strand Length (in) | Strand Length (mm) | Carrier Type | Needle Gauge |
|---|---|---|---|---|
| Example 1A | 1 | 25.4 | Fiberweb | 25 |
| Example 2A | 2 | 50.8 | Fiberweb | 25 |
| Example 3A | 1 | 25.4 | film | 25 |
| Example 4A | 2 | 50.8 | film | 25 |
| Example 5A | 1 | 25.4 | Fiberweb | 19 |
| Example | 2 | 50.8 | Fiberweb | 19 |

TABLE 1-continued

| EXAMPLE | Strand Length (in) | (mm) | Carrier Type | Needle Gauge |
|---|---|---|---|---|
| Example 6A | | | | |
| Example 7A | 1 | 25.4 | film | 19 |
| Example 8A | 2 | 50.8 | film | 19 |
| Example 1B | 1 | 25.4 | Fiberweb | 25 |
| Example 2B | 2 | 50.8 | Fiberweb | 25 |
| Example 3B | 1 | 25.4 | film | 25 |
| Example 4B | 2 | 50.8 | film | 25 |
| Example 5A | 1 | 25.4 | Fiberweb | 19 |
| Example 6B | 2 | 50.8 | Fiberweb | 19 |
| Example 7B | 1 | 25.4 | film | 19 |
| Example 8B | 2 | 50.8 | film | 19 |

TABLE 2

| EXAMPLE | Tensile Strength (psi) | MPa | IZOD Impact (ft lb$_m$ per in) | J/m | DYNATUP Impact (ft lb$_m$) | J |
|---|---|---|---|---|---|---|
| Example 1A | 7897 | 54.5 | 11.00 | 587 | 13.80 | 18.7 |
| Example 2A | 9821 | 67.8 | 12.25 | 654 | 14.47 | 19.6 |
| Example 3A | 10345 | 71.4 | 13.70 | 732 | 15.74 | 21.3 |
| Example 4A | 9933 | 68.6 | 15.10 | 806 | 14.96 | 20.3 |
| Example 5A | 9677 | 66.8 | 9.65 | 515 | 15 | 20.3 |
| Example 6A | 11354 | 78.4 | 8.70 | 465 | 15.6 | 21.1 |
| Example 7A | 10079 | 69.6 | 12.95 | 692 | 16.7 | 22.6 |
| Example 8A | 12252 | 84.6 | 12.70 | 678 | 18.8 | 25.5 |
| Example 1B | 11843 | 81.7 | 15.35 | 820 | 19.40 | 26.3 |
| Example 2B | 13742 | 94.8 | 15.80 | 844 | 18.90 | 25.6 |
| Example 3B | 12984 | 89.6 | 20.15 | 1076 | 17.5 | 23.7 |
| Example 4B | 14460 | 99.8 | 18.85 | 1007 | 20.70 | 28.0 |
| Example 5A | 12125 | 83.7 | 13.85 | 740 | 19.60 | 26.6 |
| Example 6B | 15537 | 107.2 | 14.90 | 796 | 18.50 | 25.1 |
| Example 7B | 13879 | 95.8 | 14.70 | 785 | 21.40 | 29.0 |
| Example 8B | 16232 | 112.0 | 17.05 | 910 | 22.60 | 30.6 |

As shown in Table 2 above, the results of physical property testing of the above samples indicate that composites including the mat of the present invention have good physical properties including but not limited to tensile and impact strength.

The mat of the present invention provides numerous advantages in composite forming processes such as GMT, including but not limited to good handling, processability and permeability for impregnation by thermoplastic matrix material, good uniformity of glass distribution and flow into complex mold shapes, low composite viscosity and provides composites having good surface smoothness and mechanical properties.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A mat adapted to reinforce a thermoplastic matrix material, the mat comprising:
   (a) a primary layer comprising a plurality of thermoplastic fibers, the thermoplastic fibers comprising greater than about 20 weight percent of the primary layer on a total solids basis, the primary layer comprising less than about 20 weight percent of the mat on a total solids basis; and
   (b) a secondary layer comprising a plurality of glass fiber strands, each glass fiber strand having at least about 100 glass fiber monofilaments, the plurality of glass fiber strands having a mean average length ranging from about 20 to about 150 millimeters and having a strand coating composition which is compatible with the thermoplastic matrix material applied to at least a portion of surfaces of the glass fiber strands, the secondary layer being essentially free of individual glass monofilaments and wherein at least a portion of the plurality of thermoplastic fibers of the primary layer and at least a portion of the plurality of glass fiber strands of the secondary layer are entangled by needling.

2. The mat according to claim 1, wherein the thermoplastic fibers are formed from a thermoplastic material selected from the group consisting of polyolefins, polyamides, thermoplastic polyurethanes, thermoplastic polyesters, acrylic polymers, vinyl polymers, copolymers, derivatives and mixtures thereof.

3. The mat according to claim 1, wherein the primary layer comprises about 0.01 to about 20 weight percent of the mat on a total solids basis.

4. The mat according to claim 3, wherein the primary layer comprises about 0.01 to about 5 weight percent of the mat on a total solids basis.

5. The mat according to claim 1, wherein the thermoplastic fibers of the primary layer are present as monofilaments.

6. The mat according to claim 1, wherein the thermoplastic fibers of the primary layer are present as strands comprising a plurality of monofilaments.

7. The mat according to claim 1, wherein thermoplastic fibers of the primary layer are gene rally continuous.

8. The mat according to claim 1, wherein the thermoplastic fibers of the primary layer comprises about 90 to about 100 weight percent of the primary layer of the mat on a total solids basis.

9. The mat according to claim 1, wherein the strand coating composition is present upon the surfaces of the glass fiber strands as an essentially dried residue.

10. The mat according to claim 1, wherein the secondary layer comprises less than about 5 weight percent of individual glass monofilaments on a total solids basis.

11. The mat according to claim 1, wherein the thermoplastic fibers of the primary layer and the glass fiber strands of the secondary layer are needled together at a punch density ranging from about 12 to about 62 punches per square centimeter.

12. The mat according to claim 1, wherein the mat surface weight ranges from about 200 to about 1300 grams per square meter.

13. The mat according to claim 1, wherein the primary layer of the mat further comprises a plurality of glass fibers.

14. The mat according to claim 1, wherein the secondary layer of the mat further comprises a plurality of randomly oriented essentially continuous glass fibers.

15. The mat according to claim 1, wherein the secondary layer of the mat further comprises a plurality of unidirectional essentially continuous glass fibers.

16. The mat according to claim 1, wherein the secondary layer of the mat further comprises a fabric.

17. The mat according to claim 16, wherein the fabric comprises glass fiber.

18. The mat according to claim 1, wherein the secondary layer further comprises a plurality of thermoplastic fibers.

19. A reinforced polymeric composite comprising:
(a) a thermoplastic matrix material; and
(b) a reinforcing mat comprising:
(1) a primary layer comprising a plurality of thermoplastic fibers, the thermoplastic fibers comprising greater than about 20 weight percent of the primary layer on a total solids basis, the primary layer comprising less than about 20 weight percent of the mat on a total solids basis; and
(2) a secondary layer comprising a plurality of glass fiber strands, each glass fiber strand having at least about 100 glass fiber monofilaments, the plurality of glass fiber strands having a mean average length ranging from about 20 to about 150 millimeters and having a strand coating composition which is compatible with the thermoplastic matrix material applied to at least a portion of surfaces of the glass fiber strands, the secondary layer being essentially free of individual glass monofilaments and wherein at least a portion of the plurality of thermoplastic fibers of the primary layer and at least a portion of the plurality of glass fiber strands of the secondary layer are entangled by needling.

20. The composite according to claim 19, wherein the thermoplastic matrix material is selected from the group consisting of polyolefins, polyamides, thermoplastic polyurethanes, thermoplastic polyesters, acrylic polymers, vinyl polymers, derivatives and mixtures thereof.

21. A method for making a mat adapted to reinforce a thermoplastic matrix material, the method comprising the steps of:
(a) positioning a primary layer comprising a plurality of thermoplastic fibers to receive a secondary layer comprising a plurality of glass fiber strands thereon, the thermoplastic fibers comprising greater than about 20 weight percent of the primary layer on a total solids basis, the primary layer comprising less than about 20 weight percent of the mat on a total solids basis;
(b) depositing the secondary layer of glass fiber strands upon a first side of the primary layer, each glass fiber strand having at least about 100 glass fiber monofilaments, the plurality of glass fiber strands having a mean average length ranging from about 20 to about 150 millimeters and having a strand coating composition which is compatible with the thermoplastic matrix material applied to at least a portion of surfaces of the glass fiber strands, the secondary layer being essentially free of individual glass monofilaments; and
(c) entangling the thermoplastic fibers of the primary layer with the glass fiber strands of the secondary layer by needling the thermoplastic fibers and glass fiber strands together.

22. A method for reinforcing a thermoplastic matrix material to form a reinforced composite, the method comprising the steps of:
(a) coating and impregnating at least a portion of the mat of claim 21 with a thermoplastic matrix material; and
(b) at least partially curing the polymeric matrix material to provide a reinforced polymeric composite.

* * * * *